(12) United States Patent
Fujita et al.

(10) Patent No.: US 8,795,919 B2
(45) Date of Patent: Aug. 5, 2014

(54) FUEL CELL LAYER

(75) Inventors: Goro Fujita, Osaka (JP); Erin Cooney, Armstrong (CA); James Alexander Sawada, Edmonton (CA)

(73) Assignees: Societe BIC & Sanyo Electric Co., Ltd. (FR); Societe BIC & Sanyo Electric Co., Ltd. (JP)

( * ) Notice: Subject to any disclaimer, the term of this patent is extended or adjusted under 35 U.S.C. 154(b) by 140 days.

(21) Appl. No.: 13/306,253

(22) Filed: Nov. 29, 2011

(65) Prior Publication Data

US 2013/0136954 A1    May 30, 2013

(51) Int. Cl.
*H01M 2/02*      (2006.01)
*H01M 8/24*      (2006.01)

(52) U.S. Cl.
USPC ............................ 429/463; 429/514; 429/471

(58) Field of Classification Search
None
See application file for complete search history.

(56) References Cited

U.S. PATENT DOCUMENTS

| | | |
|---|---|---|
| 2004/0146772 A1* | 7/2004 | Miyao et al. ................... 429/38 |
| 2005/0250004 A1 | 11/2005 | McLean et al. |
| 2005/0277007 A1* | 12/2005 | Yoshitake et al. ............. 429/32 |
| 2006/0153974 A1* | 7/2006 | Matsuzaki et al. ........... 427/115 |
| 2006/0194088 A1* | 8/2006 | Kabumoto ..................... 429/32 |
| 2008/0261088 A1 | 10/2008 | Cha et al. |
| 2009/0162722 A1 | 6/2009 | Schrooten et al. |
| 2009/0266799 A1 | 10/2009 | Pauser et al. |
| 2010/0129727 A1* | 5/2010 | Day et al. ..................... 429/480 |
| 2010/0248068 A1* | 9/2010 | Sekino ......................... 429/465 |
| 2011/0003229 A1 | 1/2011 | Schrooten et al. |

FOREIGN PATENT DOCUMENTS

| WO | WO-2009/105896 A1 | 9/2009 |
|---|---|---|
| WO | WO-2011/079377 A1 | 7/2011 |

* cited by examiner

*Primary Examiner* — Cynthia K. Walls
(74) *Attorney, Agent, or Firm* — Schwegman Lundberg & Woessner, P.A.

(57) ABSTRACT

MEAs are formed in regions corresponding to openings provided in a substrate. Each MEA includes an electrolyte membrane, an anode catalyst layer, and a cathode catalyst layer. The substrate has a first gas-impermeable region and a second gas-impermeable region between adjacent MEAs. A third gas-impermeable region is provided between the first gas-impermeable region and the second gas-impermeable region. The third gas-impermeable region having conductive property constitutes a part of interconnector.

12 Claims, 16 Drawing Sheets

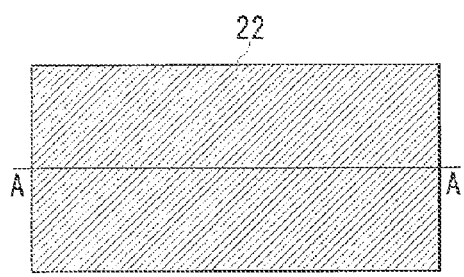
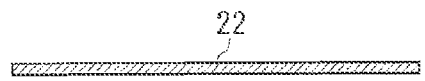
FIG. 4A  FIG. 4B
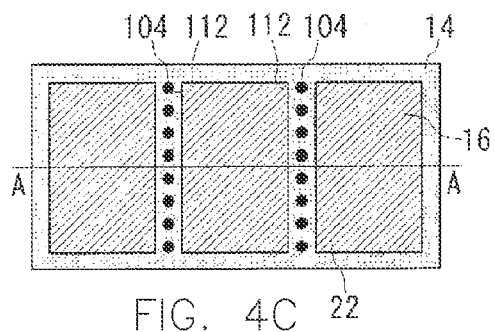
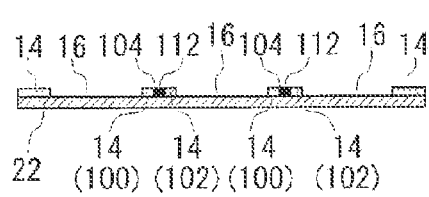
FIG. 4C  FIG. 4D

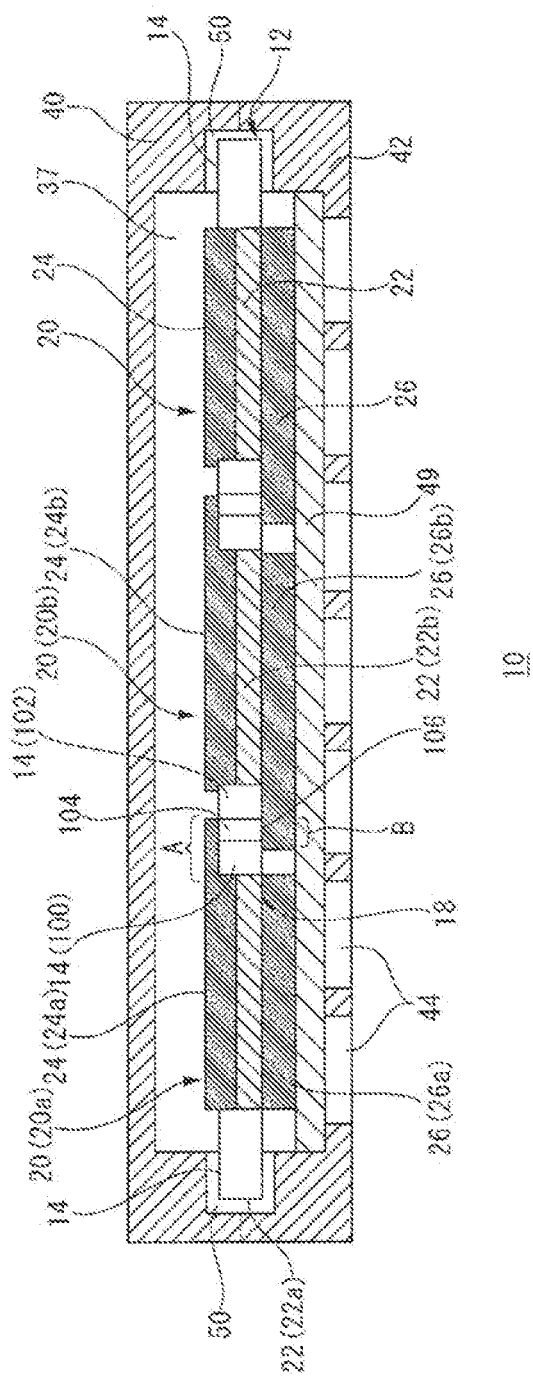

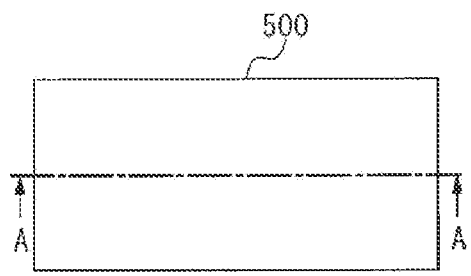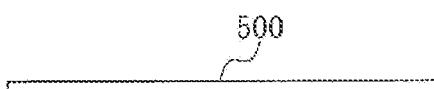
FIG. 15A   FIG. 15B
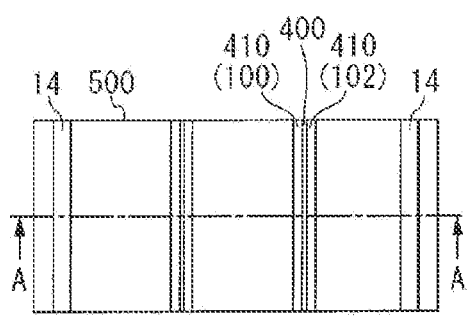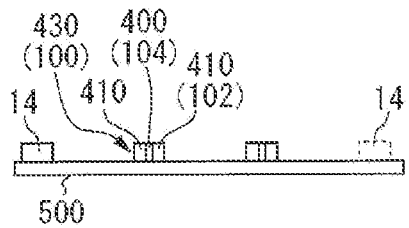
FIG. 15C   FIG. 15D
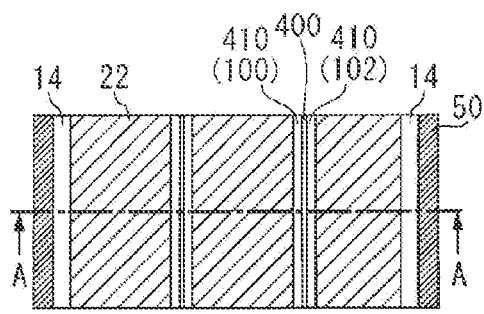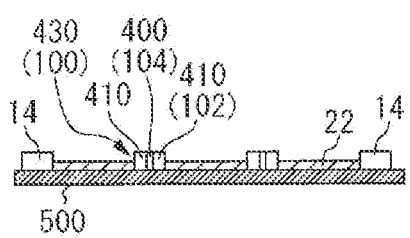
FIG. 15E   FIG. 15F

FUEL CELL LAYER

BACKGROUND OF THE INVENTION

1. Field of the Invention

The present invention relates to a fuel cell. More particularly, the invention relates to a planar fuel cell system.

2. Description of the Related Art

A fuel cell is a device that generates electricity from hydrogen and oxygen so as to obtain highly efficient power generation. A principal feature of the fuel cell is its capacity for direct power generation which does not undergo a stage of thermal energy or kinetic energy as in the conventional power generation. This presents such advantages as high power generation efficiency despite the small scale setup, reduced emission of nitrogen compounds and the like, and environmental friendliness on account of minimal noise or vibration. In this manner, the fuel cells are capable of efficiently utilizing chemical energy in its fuel and, as such, environmentally friendly. Fuel cells are therefore expected as an energy conversion system for the twenty-first century and have gained attention as a promising power generation system that can be used in a variety of applications including space applications, automobiles, mobile devices, and large and small scale power generation. Serious technical efforts are being made to develop practical fuel cells.

In particular, polymer electrolyte fuel cells feature lower operating temperature and higher output density than the other types of fuel cells. In recent years, therefore, the polymer electrolyte fuel cells have been emerging as a promising power source for mobile devices such as cell phones, notebook-size personal computers, PDAs, MP3 players, digital cameras, electronic dictionaries or electronic books. Well known as the polymer electrolyte fuel cells for mobile devices are planar fuel cells, which have a plurality of single cells arranged in a plane.

With a planar fuel cell, the electric power depends on the total area of electrodes. On the other hand, the voltage depends on the number of cells connected in series. Accordingly, in order to downsize the fuel cell and obtain necessary power and voltage, the number of cells connected in series within a limited area needs to be increased and the area of each cell needs to be made smaller. At the same time, the spacing between adjacent single cells needs to be shortened.

The cell pitch is desirable to be made smaller in order to reduce the resistive electrical losses from edge collection of electrical current. Increasing the number of fuel cells will in general reduce ohmic losses but will also reduce the total active area of the planar array due to the space overhead of the interconnect between neighbouring fuel cells. An objective of this invention is to facilitate designs and methods that can serve to decrease the size of the fuel cell interconnect regions in a planar array.

SUMMARY OF THE INVENTION

The present invention has been made in view of the foregoing problems, and a purpose thereof is to provide a technology by which the gas leak is suppressed and the spacing between adjacent cells to miniaturize each cell.

One embodiment of the present invention relates to a fuel cell layer. The fuel cell layer comprises: a composite layer having a first surface and a second surface, the composite layer including: a plurality of interconnectors; and a plurality of ion conducting components, positioned between the interconnectors; a first plurality of electrode coatings disposed on the first surface to form anodes; and a second plurality of electrode coatings disposed on the second surface to form cathodes, each of the first and second plurality of electrode coatings in ionic contact with one of the ion conducting components and in electrical contact with one of the interconnectors, at least one of the interconnectors including: a first gas-impermeable interface region and a second gas-impermeable interface region each comprising a dielectric material which has been constructed to block the transmission of laser beam, wherein the first gas-impermeable interface region and the second gas-impermeable interface region each has a first surface and a second surface, the first surface in contact with one of the ion conducting components; and a third gas-impermeable region that is electrically conductive having two surfaces and a length parallel to the two surfaces, one of the surfaces disposed adjacent to the second surface of the first and second gas-impermeable interface regions, wherein the interconnector and the third gas-impermeable region electrically connect the anode of one fuel cell to the cathode of an adjacent fuel cell, and wherein the first gas-impermeable region 100 and the second gas-impermeable region 102 are configured to prevent transmission of laser beam used in processing a catalyst layer.

In the above-described fuel cell layer, the first electrode extending from the composite layer may coat the first gas-impermeable region and may be connected to the third gas-impermeable region. The second electrode extending from the composite layer may be connected to the third gas-impermeable region. A first electrode and another first electrode may be formed integrally with each other, and the interconnector may electrically connect the first electrode and the second electrode via a through-hole provided in the first and second plurality of electrode coatings. The interconnector may extend in between a first electrode and another first electrode, and the first electrode and the another first electrode may be divided by the interconnector. The at least one of the interconnectors may provides an electrically conductive pathway between one of the first or second plurality of electrode coatings and an external circuit, said pathway extending along the length of the third gas-impermeable region. The first and second gas-impermeable regions may be made of a plurality of types of materials, and at least one of the plurality of types of materials may contain a pigment. The first and second gas-impermeable regions may be made of a plurality of types of materials, and at least one of the plurality of types of materials may contain a metal oxide particle. The first and second gas-impermeable regions may be formed by impregnating a cloth woven of glass fibers with an epoxy resin. The glass fibers may be arranged at an angle of less than 90 degrees relative to the first surface of the composite layer.

It is to be noted that any arbitrary combinations or rearrangement, as appropriate, of the aforementioned constituting elements and so forth are all effective as and encompassed by the embodiments of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 4A to 4D are process diagrams showing a fabrication method of a composite membrane used for a fuel cell according to a first embodidment;

FIG. 14 is a cross-sectional view showing a structure of a fuel cell according to a fourth embodiment of the present invention;

FIGS. 15A to 15F are process diagrams showing a fabrication method of a composite membrane used for a fuel cell according to a fourth embodiment.

DETAILED DESCRIPTION OF THE INVENTION

Figure 1:
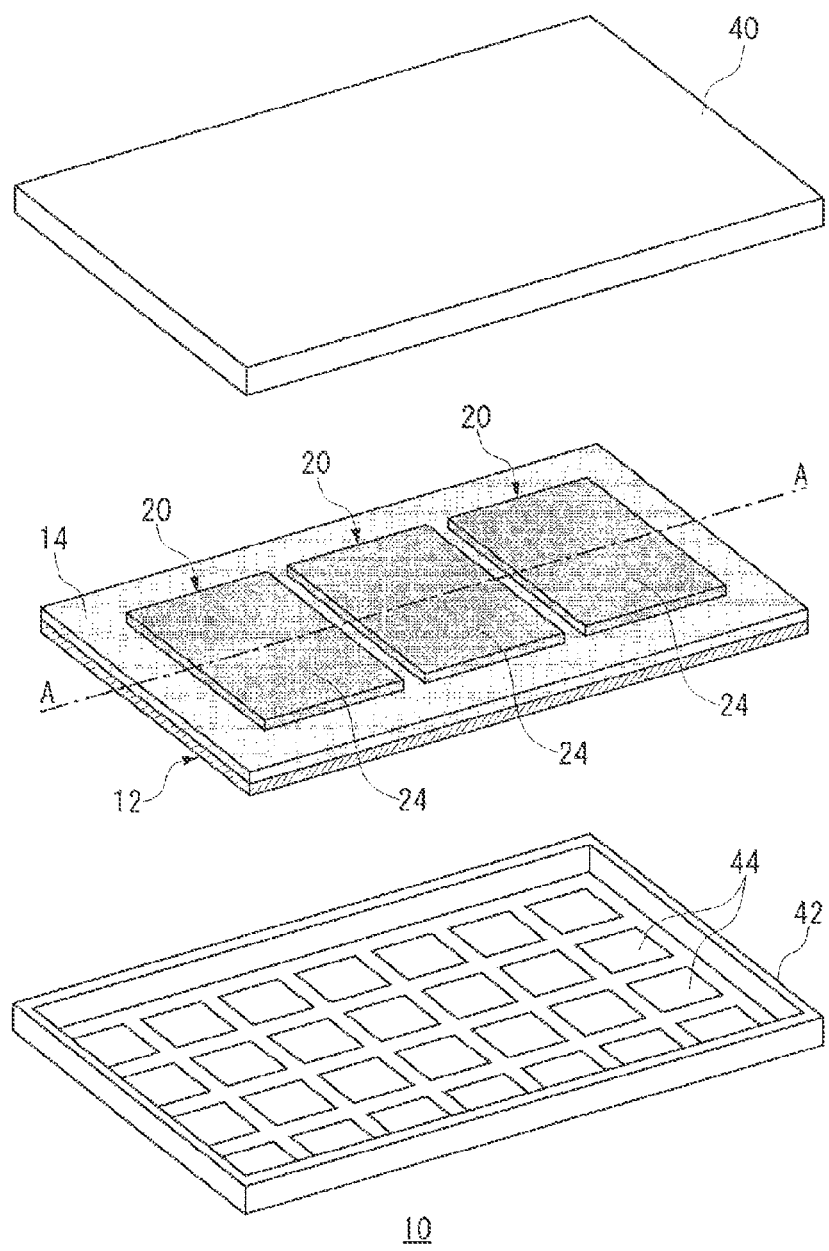
FIG. 1 is an exploded perspective view showing a structure of a fuel cell according to a first embodiment of the present invention.

Throughout the following description, specific details are set forth in order to provide a more thorough understanding of the invention. However, the invention may be practiced without these particulars. In other instances, well known elements have not been shown or described in detail in order to avoid unnecessarily obscuring the invention. The drawings show, by way of illustration, specific embodiments in which the invention may be practiced. These embodiments may be combined, other elements may be utilized or structural or logical changes may be made without departing from the scope of the invention. Accordingly, the specification and drawings are to be regarded in an illustrative, rather than a restrictive, sense.

All publications, patents and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used to include one or more than one, independent of any other instances or usages of "at least one" or "one or more". In this document, the term "or" is used to refer to a nonexclusive or, such that "A, B or C" includes "A only", "B only", "C only", "A and B", "B and C", "A and C", and "A, B and C", unless otherwise indicated. The terms "above" and "below" are used to describe two different directions in relation to the center of a composite and the terms "upper" and "lower" may be used to describe two different surfaces of a composite. However, these terms are used merely for ease of description and are not to be understood as fixing the orientation of a fuel cell layer of the described embodiments. In the appended aspects or claims, the terms "first", "second" and "third", etc. are used merely as labels, and are not intended to impose numerical requirements on their objects. It shall be understood that any numerical ranges explicitly disclosed in this document shall include any subset of the explicitly disclosed range as if such subset ranges were also explicitly disclosed; for example, a disclosed range of 1-100, or less than or equal to 100 but greater than or equal to 1, shall also include the ranges 1-80, 2-76, or any other numerical range that falls between 1 and 100.

Hereinbelow, the embodiments will be described with reference to the accompanying drawings. Note that in all of the Figures the same reference numerals are given to the same components and the repeated description thereof is omitted as appropriate.

Multiple examples of composite layer architecture, including arrays of electrochemical cells such as fuel cell layers that can be utilized as a composite layer subject to the inventive method are described in US Patent App. Pub. No. 2011/0003229, filed 27 Feb. 2009 as PCT App. No. PCT/CA/09/00253 and entitled ELECTROCHEMICAL CELL AND MEMBRANES RELATED THERETO, the disclosure of which is herein incorporated by reference in its entirety. Further examples of fuel cell layers are described in U.S. Patent App. Pub. No. 2005/0250004, which was filed on 2 Feb. 2005 as U.S. App. Ser. No. 11/047560 and entitled "ELECTROCHEMICAL CELLS HAVING CURRENT-CARRYING STRUCTURES UNDERLYING ELECTROCHEMICAL REACTION LAYERS", PCT International App. Pub. No. WO 2011/079377, which was filed on 23 Dec. 2010 and entitled "Fuel Cells and Fuel Cell Components Having Asymmetric Architecture and Methods Thereof," and US Patent Pub. No. 2009/0162722, filed 22 Dec. 2008 and entitled ELECTROCHEMICAL CELL ASSEMBLIES INCLUDING A REGION OF DISCONTINUITY, the entire disclosures of which are incorporated herein by reference. Example fuel cell layers are described in the embodiments below; however, it should be understood that the invention could be practiced with any of the fuel cells and fuel cell layers described in any of the patent documents incorporated herein by reference. For clarity, the Figures herein illustrate various embodiments of fuel cell layers that include arrangements of only a relatively small number of fuel cell components; however, the methods of the present invention can be applied to fuel cell layers with a much larger number of fuel cell components.

To reduce the size of the planar fuel cell, the interval (spacing) between cells must be narrowed. For example, a technique using a laser processing is known as a method for narrowing the interval between them. In this technique, a catalyst layer of normal membrane electrode assembly is partially removed by the use of laser beams so as to fabricate a planar fuel cell array.

The problem this invention addresses is that in certain planar fuel cell configurations very narrow regions of discontinuity must be formed on the surfaces of the fuel cell layer in order to provide a separation of neighbouring fuel cells while maintaining as dense a packing of the fuel cells as possible. Lasers have been successfully used to make very narrow gaps, but laser beams can have a tendency to be transmitted through the fuel cell layer to burn through the electrodes on the opposite side of the cell to the side being processed. The effect of this unwanted transmission is to create unwanted regions of discontinuity in planar fuel cell catalyst layers. This invention aims to produce a modified structure and method of forming gaps that can reduce the frequency of discontinuity of the catalyst layer on the opposite side of the gap and the frequency of hydrogen leakage due to laser burnthrough.

(First Embodiment)

Figure 2:
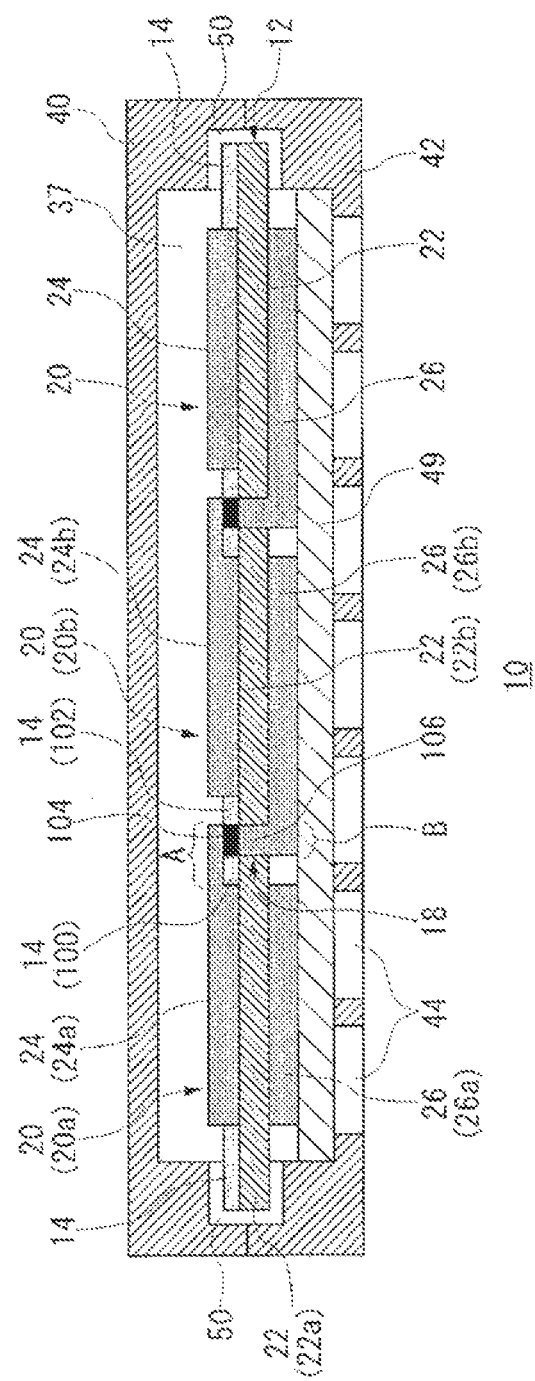
FIG. 2 is a cross-sectional view of a fuel cell, taken along the line A-A, where components of FIG. 1 are combined and incorporated.

FIG. 1 is an exploded perspective view of a fuel cell 10 according to a first embodiment of the present invention. FIG. 2 is a cross-sectional view thereof taken along the line A-A of FIG. 1. As shown in FIG. 1 and FIG. 2, the fuel cell 10 includes a composite membrane 12 into which membrane electrode assemblies (MEA, also called a catalyst coated membranes (CCM)) 20 are incorporated, an anode housing 40, and a cathode housing 42. A sealing member 50 (described later) is provided around the peripheral edge part of the composite membrane 12.

The composite membrane 12 includes a substrate 14, a plurality of MEAs 20, and members required to electrically connect adjacent MEAs 20.

The substrate 14 is formed of a dielectric material such as a commonly-used polymer (e.g., epoxy resin and polyacrylate). Openings 16 the number of which is equal to the number of MEAs 20 are provided in the substrate 14.

Each MEA 20 includes an electrolyte membrane 22, an anode catalyst layer (first electrode) 24 provided on one face of the electrolyte membrane 22, and a cathode catalyst layer (second electrode disposed counter to the first electrode) 26 provided on the other face of the electrolyte membrane 22. The MEAs 20 are provided in alignment with the openings 16 provided in the substrate 14. Hydrogen is supplied to the anode catalyst layer 24 as fuel gas. Air is supplied to the cathode catalyst layer 26 as oxidant. Each cell is structured by a pair of anode catalyst layer 24 and cathode catalyst layer 26 with the electrolyte membrane 22 held between the anode catalyst layer 24 and the cathode catalyst layer 26. Each cell generates electric power through an electrochemical reaction between hydrogen and oxygen in the air.

In this manner, the fuel cell according to the first embodiment comprises a plurality of cells, in a planar arrangement, which are composed of the plurality of pairs of the anode catalyst layers 24 and the cathode catalyst layers 26.

A description is given hereinafter of an electrical connection structure between two adjacent MEAs and a mode of the MEA wherein one of the two adjacent MEAs 20 is denoted by an MEA 20a and the other thereof an MEA 20b.

An interconnector 18 is so provided as to penetrate the substrate 14 in between the adjacent MEAs 20. An anode catalyst layer 24a covered by the electrolyte membrane 22 of MEA 20a is so provided as to extend to the interconnector 18, and this anode catalyst layer 24a covers the substrate 14 disposed between the interconnector 18 and the electrolyte membrane 22 of one cell and connects to the interconnector 18. In adjacent cells, a cathode catalyst layer 26 covered by the electrolyte membrane 22 of the other cell is so provided as to extend to the interconnector 18, and this cathode catalyst layer 26 covers the substrate 14 disposed between the interconnector 18 and the electrolyte membrane 22 of the other cell and connects to the interconnector 18. The interconnector 18 is formed of a conductive material such as carbon. By employing the above-described structure, the adjacent cells are connected in series with each other by the interconnector 18.

The electrolyte membrane 22, which may show excellent ion conductivity in a moist, or humidified, condition, functions as an ion-exchange membrane for the transfer of protons between the anode catalyst layer 24 and the cathode catalyst layer 26. The electrolyte membrane 22 is formed of a solid polymer material such as a fluorine-containing polymer or a non-fluorinated polymer. The material that can be used is, for instance, a sulfonic acid type perfluorocarbon polymer, a polysulfone resin, a perfluorocarbon polymer having a phosphonic acid group or a carboxylic acid group, or the like. An example of the sulfonic acid type perfluorocarbon polymer is a Nafion ionomer dispersion (made by DuPont: registered trademark). Also, an example of the non-fluorinated polymer is a sulfonated aromatic polyether ether ketone, polysulfone or the like.

The anode catalyst layer 24 and the cathode catalyst layer 26 are each provided with ion-exchange material and catalyst particles or carbon particles as the case may be.

The ion-exchange material provided in the anode catalyst layer 24 and the cathode catalyst layer 26 may be used to promote adhesion between the catalyst particles and the electrolyte membrane 22. This ion-exchange material may also play a role of transferring protons between the catalyst particles and the electrolyte membrane 22. The ion-exchange material may be formed of a polymer material similar to that of the electrolyte membrane 22. A catalyst metal may be a single element or an alloy of two or more elements selected from among Sc, Y, Ti, Zr, V, Nb, Fe, Co, Ni, Ru, Rh, Pd, Pt, Os, Ir, lanthanide series element, and actinide series element. Acetylene black, ketjen black, carbon nanotube or the like may be used as the carbon particle when a catalyst is to be supported.

Figure 3:
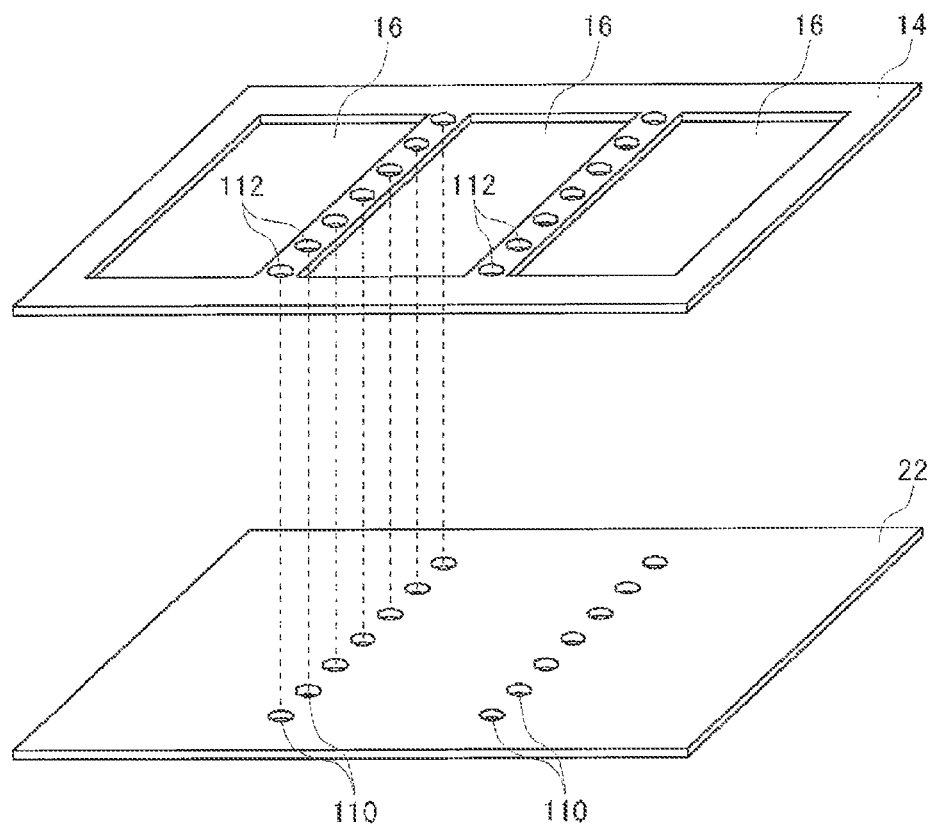
FIG. 3 is a perspective view showing a substrate and an electrolyte membrane.

FIG. 3 is a perspective view showing a substrate 14 and an electrolyte membrane 22. In the present embodiment, the opening shape of the through-holes 112 formed in the substrate 14 and the opening shape of the through-holes 110 formed in the electrolyte membrane 22 are circular but the opening shape thereof is not limited thereto. The opening shape thereof may be elliptical or rectangular, for instance. If the opening shape is elliptical or rectangular, the long-side direction or long axis direction is preferably a direction along opposite sides of adjacent MEAs 20. With this arrangement, the wasted space occurring between adjacent MEAs 20 can be reduced and therefore the power generation effective area can be increased.

The substrate 14, which is formed of a material having a dielectric and gas-impermeable property, and has a function of dielectric connection between anode catalyst layers 24 of adjacent MEAs 20. A material used for the substrate 14 may be a commonly-used polymer dielectric layer such as epoxy resin, fiber-reinforced epoxy resin, epoxy resin doped with additive that adsorbs laser beams, or polyacrylate.

Referring back to FIG. 2, the substrate 14 has a first gas-impermeable region 100 and a second gas-impermeable region 102 in a region between adjacent MEAs 20.

The first gas-impermeable region 100 is provided in contact with an anode-side main face of an electrolyte membrane 22a that extends from the MEA 20a so as to align with a space between a cathode catalyst layer 26a of the MEA 20a and a cathode catalyst layer 26b of the MEA 20b.

The second gas-impermeable region 102 is provided in contact with an anode-side main face of an electrolyte membrane 22b that extends from the MEA 20b in such a manner as to be exposed in a space between an anode catalyst layer 24a of the MEA 20a and an anode catalyst layer 24b of the MEA 20b.

The first gas-impermeable region 100 and the second gas-impermeable region 102 are configured to prevent transmission of laser beam used in processing a catalyst layer. By employing this method and structure, as will be later explained in the method for fabricating a composite membrane, laser beam is so controlled as not to permeate the first gas-impermeable region 100 and the second gas-impermeable region 102 when the laser beam is irradiated to process the anode catalyst layer 24 and the cathode catalyst layer 26. As a result, it prevents laser burn-through into the catalyst layer on the opposite side of the catalyst layer to be processed More specifically, the first gas-impermeable region 100 and the second gas-impermeable region 102 are each constituted by a dielectric layer made of an epoxy resin added with an additive that absorbs laser beams for use in catalyst processing or a well-known polymer resin. This dielectric layer may be reinforced by fibers. The additive has two mechanisms to prevent laser burn-through into the catalyst layer on the opposite side of the catalyst layer to be processed by the laser processing. Firstly, the additive scatters the laser beam and thereby reduces the transmission of laser beams. Secondly, the additive absorbs the laser beam by selecting the additive according to an absorption band conforming to the wavelength of the laser beam; as a result, the transmission of laser beams can be reduced and eventually laser burn-through into the catalyst layer on the opposite side of the catalyst layer to be processed by the laser processing can be reduced. For example, red iron oxide originally absorbs much of green laser beam. Iron oxide absorbs much of UV laser beam. The additive is preferably selected based on not only the capacity of scattering the laser beam but also the capacity of absorbing a particular wavelength of laser beam used. The amount of additive contained in the first gas-impermeable region 100 and the second gas-impermeable region 102 is preferably within a range of 10 wt. % with the total weight of the regions 100 and 102 as a reference. A metal oxide material used for the additive may be ferric oxide (99.5%, 325 mesh, manufactured by Alfa Aesar), titanium oxide (rutile-type, 99.5%, fine powders of 1 to 2 μm, manufactured by Alfa Aesar), zinc oxide (coated with Nanoguard, fine powers of 400 to 100 nm, manufactured by Alfa Aesar), zinc oxide (ACS, 325 mesh, manufactured by Alfa Aesar) or the like.

Further, the first gas-impermeable region 100 and the second gas-impermeable region 102 are each formed of a dielectric layer made of fiber-reinforced epoxy resin or commonly-used polymer resin. More specifically, the first gas-impermeable region 100 and the second gas-impermeable region 102 are each formed by impregnating a cloth woven of glass fibers with epoxy resin. In this case, the fibers in the dielectric layer are so oriented as to prevent the transmission of laser beam. For example, where the cloth of glass fibers is used, the orientation of glass fibers is preferably not placed in a direction toward the laser beam so that the fibers do not serve as a light transmissive material. For example, the fibers are oriented at an angle of 45 degrees relative to the laser beam used for the processing of the catalyst layer, so that laser transmission volume can be significantly reduced. Also, the dielectric layer made of fiber-reinforced epoxy resin or commonly-used polymer resin may be formed of a fibrous material of nonwoven cloth type or randomly oriented short fibers.

An interconnector 18 functions to electrically connect the anode catalyst layer 24a of MEA 20a and the cathode catalyst layer 26b of MEA 20b.

The interconnector 18 includes a third gas-impermeable region 104 and a conductor 106. The third gas-impermeable region 104 is provided between the first gas-impermeable region 100 and the second gas-impermeable region 102, and belongs to the same layer as the first gas-impermeable region 100 and the second gas-impermeable region 102. In the present embodiment, the third gas-impermeable region 104 fills in the through-holes 112 provided in the substrate 14. The third gas-impermeable region 104 of the interconnector 18 is formed of a conductive and gas-impermeable material. A material used for the third gas-impermeable region 104 may be carbon FRP, expanded graphite impregnated with resin, a precious metal or the like.

The conductor 106 is so formed as to penetrate the electrolyte membrane 22 between adjacent MEAs 20. As described above, the conductor 106 is in contact with the aforementioned third gas-impermeable region 104 at an anode side, whereas the conductor 106 is in contact with the cathode catalyst layer 26b at a cathode side. In the present embodiment, the conductor 106 and the cathode catalyst layer 26b are formed integrally with each other, and therefore a part of the cathode catalyst layer 26b serves also as the conductor 106. Note here that the conductor 106 may be formed of a material different from the material constituting the cathode catalyst layer 26b.

The anode catalyst layer 24a has area A that extends from the MEA 20a to the MEA 20b. The area A covers the first gas-impermeable region 100 and is positioned on a surface of the third gas-impermeable region 104, so that the region A and the third gas-impermeable region 104 are electrically connected to each other.

In the present embodiment, the electrolyte membrane 22 of the MEA 20a and the electrolyte membrane 22 of the MEA 20b are formed integrally with each other. The through-hole 110 is provided in a region of the electrolyte membrane 22 between the MEA 20a and the MEA 20b. The cathode catalyst layer 26b has area B that extends from the MEA 20b to the MEA 20a. The area B of the cathode catalyst layer 26b penetrates the through-hole 110 provided in the electrolyte membrane 22 and connects electrically and physically to the third gas-impermeable region 104. Thereby, the anode catalyst layer 24a of the MEA 20a and the cathode catalyst layer 26b of the MEA 20b are electrically connected to each other.

Similar to the first gas-impermeable region 100 and the second gas-impermeable region 102, the third gas-impermeable region 104 has gas-impermeable property, and a region between the MEA 20a and the MEA 20b is occupied by a gas-impermeable region composed of the first gas-impermeable region 100, the second gas-impermeable region 102 and the third gas-impermeable region 104.

The anode housing 40 constitutes a fuel storage 37 for storing fuel. A fuel supply port (not shown) is formed in the anode housing 40, so that the fuel can be supplied as needed from the fuel cartridge or the like.

On the other hand, the cathode housing 42 is provided with air inlets 44 for feeding air from outside.

The anode housing 40 and the cathode housing 42 may be fastened to each other by fasteners (not shown), such as bolts and nuts, via sealing members 50 provided along a peripheral edge part of the composite membrane 12. The fasteners giving pressure to the sealing members 50 may improve the sealing performance of the sealing member 50. Such fasteners may be optional depending on the construction and geometry of the fuel cell and enclosures.

A vapor-liquid separator 49 is provided between a face of the cathode housing 42, where the air inlets 44 are provided, and the cathode catalyst layer 26. The vapor-liquid separator 49 is formed of Teflon (registered trademark), for instance. Air taken in from the air inlets 44 passes through the vapor-liquid separator 49 and then flows into the cathode catalyst layer 26. Moisture generated when water generated in the cathode catalyst layer 26 is vaporized passes through the vapor-liquid separator 49 and is then discharged from the air inlets 44 to the exterior. On the other hand, condensed water as a result of condensation of moisture outside the vapor-liquid separator 49 cannot pass through the vapor-liquid separator 49. Thereby, so-called flooding where the water volume in the cathode catalyst layer 26 becomes excessive is suppressed.

In the fuel cell 10 as described above, a part of the interconnector 18 electrically connecting the adjacent MEAs 20 is constituted by the third gas-impermeable region 104, and a space between the adjacent MEAs 20 is blocked by the substrate 14 including the first gas-impermeable region 100 and the second gas-impermeable region 102 both connecting to the third gas-impermeable region 104. This structure suppresses the gas leak from occurring in an interconnector forming region between the adjacent MEAs 20.

Further, the first gas-impermeable region 100, the second gas-impermeable region 102 and the third gas-impermeable region 104 suppress the gas leak from occurring in between the adjacent MEAs, so that the conductor 106 constituting a part of the interconnector 18 can be made to serve as a catalyst layer itself having the gas permeability.

As a result, the spacing between the adjacent MEAs 20 can be narrowed, so that a higher integration of the planar fuel cell can be achieved.

It is to be noted that "fuel cell layer" in this patent specification may include one or more unit fuel cells, arranged adjacently to one another.

(Method for Fabricating a Composite Membrane)

A method for fabricating a composite membrane 12 used for the fuel cell 10 according to the first embodiment will now be described with reference to FIG. 4A to FIG. 5F. FIG. 4A to FIG. 5F are process diagrams showing a method for manufacturing the composite membrane 12 according to the first embodiment. In FIG. 4A to FIG. 5F, diagrams on the left show plan views whereas those on the right show cross-sectional views taken along the line A-A of the respective plan views.

The array is processed using two laser beams of different wavelength. The first wavelength is capable of ablating electrolyte material and is used to form penetrating holes through the electrolyte layer to form electrical interconnects. The second wavelength is used to selectively remove catalyst layers, but this wavelength penetrate the electrolyte layer and doesn't process the electrolyte layer.

As shown in FIGS. 4A and 4B, an electrolyte membrane 22 having a shape and an area by which a plurality of MEAs can Be provided side is first prepared.

Then, as shown in FIGS. 4C and 4D, a substrate 14 is placed on the electrolyte membrane 22 and bonded by themocompression. In order to improve adhesiveness and gas seal performance, Nafion dispersion (DuPont D2020) may be applied between the electrolyte membrane 22 and the base material 14 as adhesives. Openings 16 corresponding to the forming regions of MEAs (MEA forming regions) are provided in the substrate 14. Through-holes 112 are provided in a region between adjacent openings 16 at predetermined. intervals. A third gas-impermeable region 104 is filled into the through-hole 112. The third gas-impermeable region 104 may be filled beforehand into the through-hole 112 before the substrate 14 is placed on the electrolyte membrane 22. Or the third gas-impermeable region 104 may be filled into the through-hole 112 after the substrate 14 has been placed on the electrolyte membrane 22. In the present. embodiment, the face of the electrolyte membrane 22 where the substrate 14 is provided corresponds to the anode side, whereas the face opposite to the side where the substrate 14 is provided. is the cathode side. As shown in FIG. 4D, regions holding the third gas-impermeable region 104 therebetween are the first gas-impermeable region 100 and the second gas -impermeable region 102. "The first gas-impermeable region 100 and the second gas-impermeable region 102" which are the portion of the substrate 14 are constructed of material which is not penetrated by the laser of the 2nd wavelength for catalyst layer processing.

Figure 5A:
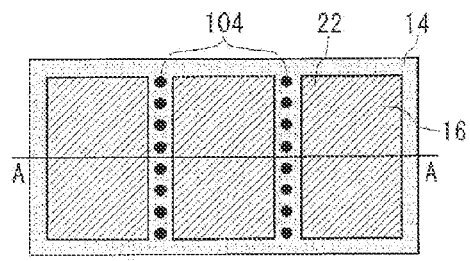
FIGS. 5A to 5F are process diagrams showing a fabrication method of a composite membrane used for a fuel cell according to a first embodiment.
Figure 5B:
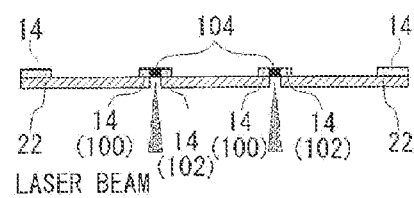

Then, as shown in FIGS. 5A and 5B, laser is irradiated toward a predetermined region of the electrolyte membrane 22 from the cathode side. This predetermined region corresponds to a region where the third gas-impermeable region 104 is formed. The predetermined region of the electrolyte membrane 22 is selectively removed by the laser irradiation and, at the same time, through-boles 110 are formed in the electrolyte membrane 22 and the third gas-impermeable region 104 is exposed at the cathode side. The wavelength of laser beam used in this process lies in a range within which the electrolyte membrane 22 can be processed, namely 1064 to 10,600 nm, for instance.

Figure 5C:
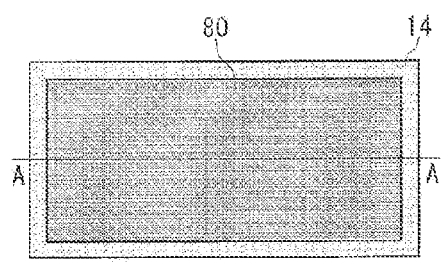
Figure 5D:
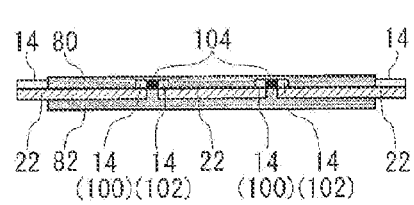

Then, as shown in FIGS. 5C and 5D, the peripheral parts of the electrolyte membrane 22 are left intact, and a catalyst slurry is applied to the entire electrolyte membrane 22 on the anode and cathode sides, thereby forming a catalyst layer 80 and a catalyst layer 82.

Figure 5E:
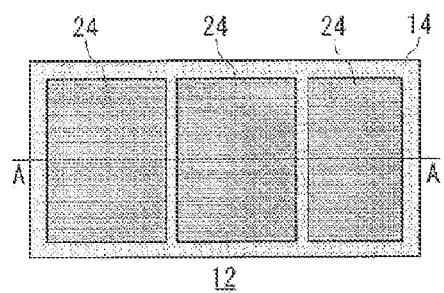
Figure 5F:
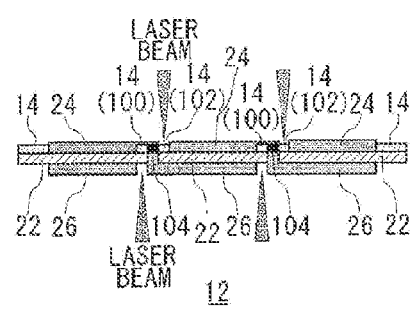

Then, as shown in FIGS. 5E and 5F, the catalyst layer applied. to the anode side of the electrolyte membrane 22 is selectively removed by the laser irradiation so as to form an anode catalyst layer 24, and the second gas-impermeable region 102 is exposed. On the other hand, the catalyst layer applied to the cathode side of the electrolyte membrane 22 is selectively removed by the laser irradiation so as to form a cathode catalyst layer 26, and a portion. of the electrolyte membrane 22 in contact with the first gas-impermeable region 100 is exposed. In other words, a region of the catalyst layer 82, corresponding to the first gas-impermeable region 100, with the electrolyte membrane 22 being held between the catalyst layer 82 and the first gas-impermeable region 100 in the catalyst layer 80 is irradiated with laser so as to selectively remove the catalyst layer 82. Since the laser beam that has transmitted the electrolyte membrane 22 is blocked by the first gas-impermeable region 100, the occurrence of damage to the catalyst layer 80 can be suppressed. The wavelength of laser used in this process lies in a range where the catalyst layer (electrode) 82 can be processed and the electrolyte membrane 22 can be transmitted, namely 180 to 550 nm, for instance. In this manner, the wavelength of laser used in this process differs from the wavelength of laser used in the process shown in FIGS. 5A and 5B.

The composite membrane 12, into which the MEAs 20 according to the first embodiment are incorporated, is simply and easily manufactured through the above-described processes.

A description is given hereunder of a modification of the method for fabricating a composite membrane. FIGS. 6A to 6C, FIGS. 8A to 8D and FIGS. 9A to 9F are process diagrams showing a fabrication method of a composite membrane used for the fuel cell according to this modification. In FIGS. 8A to 8D and FIGS. 9A to 9F, diagrams on the left show plan views whereas those on the right show cross-sectional views taken along the line A-A of the respective plan views.

The array is processed using two laser beams of different wavelength. The first wavelength is capable of ablating electrolyte material and is used to form penetrating holes through the electrolyte layer to form electrical interconnects. The second wavelength is used to selectively remove catalyst layers, but this wavelength penetrate the electrolyte layer and doesn't process the electrolyte layer.

Figure 6A:
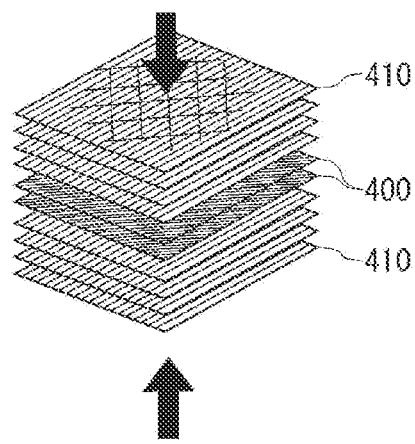
FIGS. 6A to 6C are process diagrams showing a fabrication method of a composite membrane used for a fuel cell according to a modification.

As shown in FIG. 6A, prepared first are a plurality of conductive sheets 400 each of which is formed of a gas-impermeable and conductive material, such as carbon FRP, and a plurality of resin sheets 410 each of which is obtained when a member, composed of vertical fibers and horizontal fibers, where the vertical fibers and the horizontal fibers are interwoven orthogonally is impregnated with epoxy resin. A plurality of resin sheets 410 are laminated on the both main faces of the conductive sheet 400, and then the resin sheets 410 together with the conductive sheet 400 are heated and hardened.

Figure 6B:
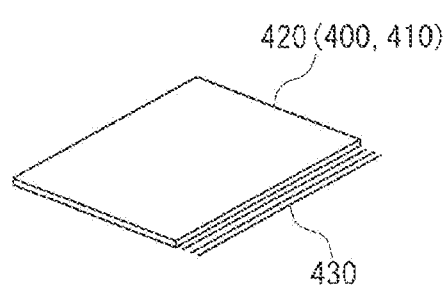

Then, as shown in FIG. 6B, a layered product 420 comprised of the conductive sheets 400 and the resin sheets 410 are cut in rectangles and then cleansed so as to obtain a compound material 430.

Note here that the conductive sheet 400 corresponds to the third gas-impermeable resin 104 as shown in FIGS. 4C and 4D. Also, a resin sheet 410 stacked on one side of the conductive sheet 400 corresponds to the first gas-impermeable region 100. A resin sheet 410 stacked on the other side thereof corresponds to the second gas-impermeable region 102 as shown in FIGS. 4C and 4D.

The first gas-impermeable region 100 and the second gas-impermeable region 102 are configured to prevent transmission of laser beam used in processing a catalyst layer. By employing this method and structure, laser beam is so controlled as not to permeate the first gas-impermeable region 100 and the second gas-impermeable region 102 when the laser beam is irradiated to process the anode catalyst layer 24 and the cathode catalyst layer 26. As a result, it prevents processing the catalyst layer on the opposite side of the catalyst layer to be processed The fibers in the dielectric layer are so oriented as to prevent the transmission of laser beam. For example, where the cloth of glass fibers is used, the orientation of glass fibers is preferably not placed in a direction toward the laser beam so that the fibers do not serve as a light transmissive material. For example, the fibers are oriented at an angle of 45 degrees relative to the laser beam used for the processing of the catalyst layer, so that laser transmission volume can be significantly reduced. Furthermore, a dielectric layer may constitute epoxy resin added with additive that absorbs laser beams for use in catalyst processing.

Figure 6C:
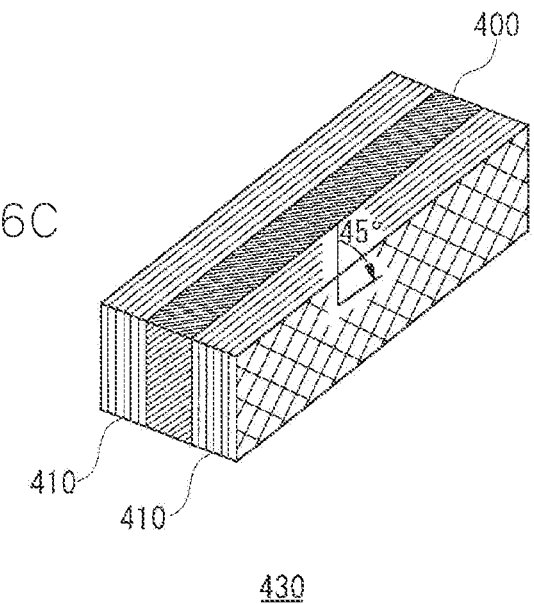

FIG. 6C is an enlarged perspective view of the compound material 430. Both the vertical fibers and the horizontal fibers of glass fibers in the resin sheet 410 are oriented in a 45-degree direction relative to a direction normal to the cutting plane of the compound material 430 where a stacking structure constituted by the conductive sheets 400 and the resin sheets 410 is exposed (the direction of the above-described processing laser beam).

Figure 7:
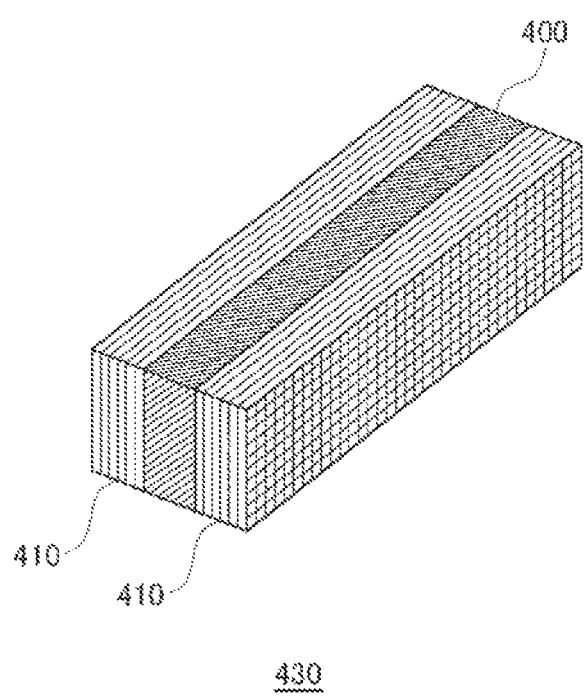
FIG. 7 is an enlarged perspective view showing a compound material used for a fuel cell according to a modification.

In the above-described modification, the vertical fibers and the horizontal fibers in the resin sheet 410 are oriented in a 45-degree direction relative to the direction normal thereto. However, when the resin sheets 410 are manufactured, the directions of the vertical fibers and the horizontal fibers of glass fibers in the layered product 420 can be set to a desired direction by varying the direction of glass fibers relative to a side of the resin sheet 410. FIG. 7 shows a mode of carrying out the modification wherein the direction of the vertical fibers of glass fibers in the resin sheet 410 is parallel to a direction normal to the cutting plane and the direction of the horizontal fibers is 90 degrees relative to a direction normal to the cutting plane.

Figure 8A:
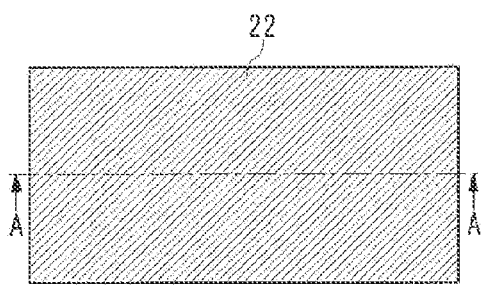
FIGS. 8A to 8D are process diagrams showing a fabrication method of a composite membrane used for a fuel cell according to a modification.
Figure 8B:
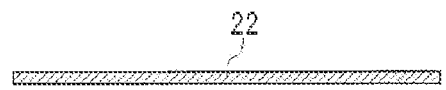

Then, as shown in FIGS. 8A and 8B, prepared is an electrolyte membrane 22 having such shape and area that a plurality of MEAs can be provided side by side.

Figure 8C:
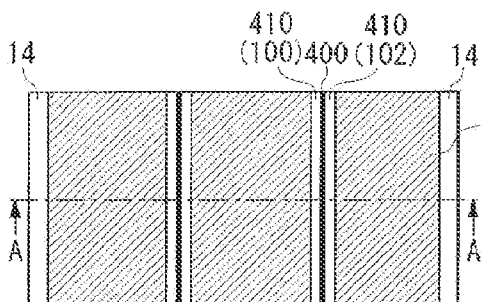
Figure 8D:
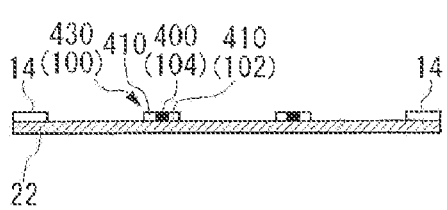

Then, as shown in FIG. 8C and 8D, a compound material (current collector) 420 shaped in rectangles is fixed on the electrolyte membrane 22 in such a manner as to divide the forming regions of the adjacent MEAs. Also, the compound material (current collector) 420 shaped in rectangles is placed along an end of the electrolyte membrane 22 in a longitudinal direction and bonded by thermo-compression. In order to improve adhesiveness and gas seal performance, Nafion dispersion (DuPont D2020) may be applied between the electrolyte membrane 22 and the base material 14 as adhesives.

Figure 9A:
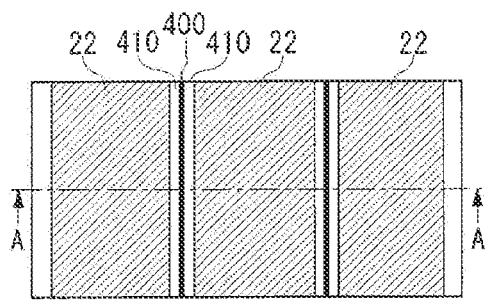
FIGS. 9A to 9F are process diagrams showing a fabrication method of a composite membrane used for a fuel cell according to a modification.

Then, as shown in FIG. 9A, the laser beam is irradiated from the cathode side of electrolyte membrane 22 so as to form a plurality of through-hole in the electrolyte membrane overlapping with the conductive sheet 400. The wavelength of laser beam used in this process lies in a range within which the electrolyte membrane 22 can be processed, namely 1064 to 10,600 nm, for instance.

Figure 9B:
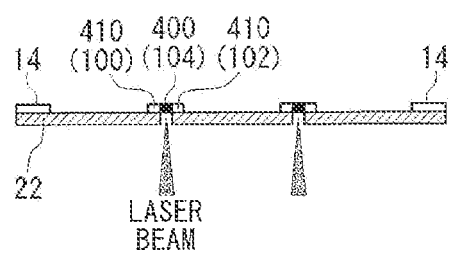

Then, as shown in FIG. 9B, the peripheral parts of the electrolyte membrane 22 are left intact, and a catalyst slurry is applied to the entire electrolyte membrane 22 on the anode and cathode sides, thereby forming a catalyst layer 80 and a catalyst layer 82.

Figure 9C:
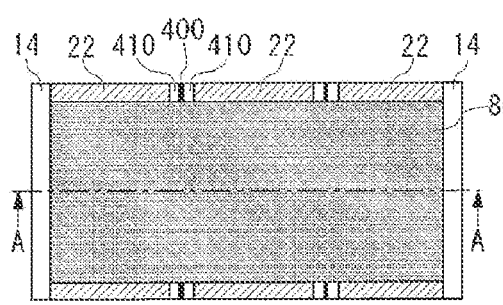
Figure 9D:
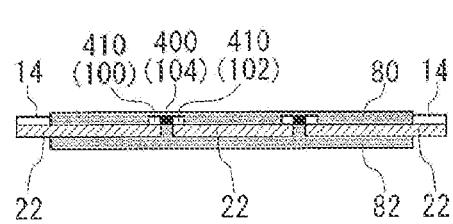
Figure 9E:
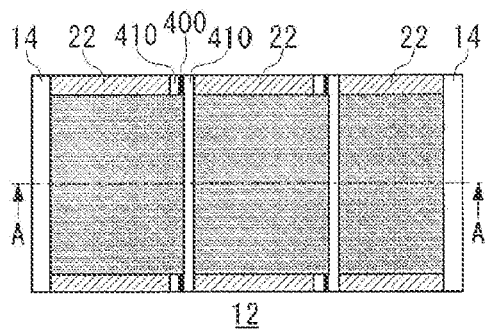
Figure 9F:
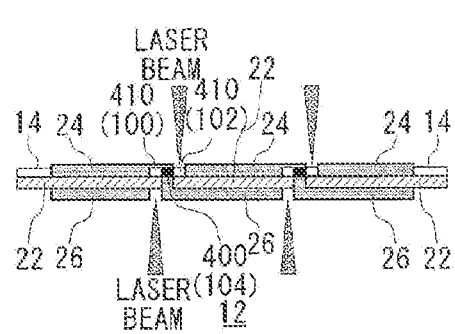

Then, as shown in FIG. 9C, the catalyst layer applied to the anode side of the electrolyte membrane 22 is selectively removed by the laser irradiation so as to form an anode catalyst layer 24, and a resin sheet 410 corresponding to the second gas-impermeable region 102 is exposed. On the other hand, the catalyst layer applied to the cathode side of the electrolyte membrane 22 is selectively removed by the laser irradiation so as to form a cathode catalyst layer 26, and the electrolyte membrane 22 in a region in contact with a resin sheet 410 corresponding to the first gas-impermeable region 100 is exposed. Since the laser beam that has transmitted the electrolyte membrane 22 is blocked by the resin sheet 410 corresponding to the first gas-impermeable region 100, the occurrence of damage to the catalyst layer 80 is suppressed. The wavelength of laser used in this process lies in a range where the catalyst layer (electrode) 82 can be processed and the electrolyte membrane 22 can be transmitted, namely 180 to 550 nm, for instance. In this manner, the wavelength of laser used in this process differs from the wavelength of laser used in the process shown in FIG. 9A.

The composite membrane 12, into which the MEAs 20 according to the modification are incorporated, is simply and easily manufactured through the above-described processes.

(Second Embodiment)

Figure 10:
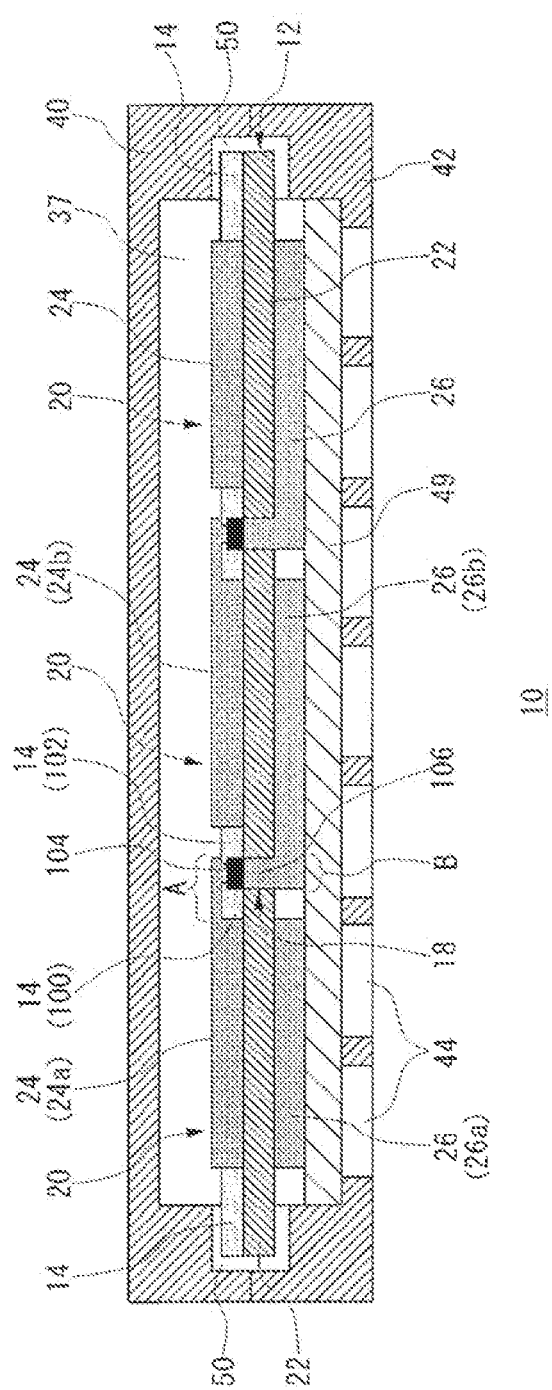
FIG. 10 is a cross-sectional view showing a structure of a fuel cell according to a second embodiment of the present invention.

FIG. 10 is a cross-sectional view showing a structure of a fuel cell 10 according to a second embodiment of the present invention. In the fuel cell 10 according to the first embodiment, the first to the third gas-impermeable regions 100, 102 and 104 are of almost the same thickness. In the second embodiment, the first gas-impermeable region 100 and the second gas-impermeable region 102 are thicker than the third gas-impermeable region 104. Further, a part of the first gas-impermeable region 100 extends over the third gas-impermeable region 104. Similarly, a part of the second gas-impermeable region 102 extends over the third gas-impermeable region 104. By employing this structure of the second embodiment, the third gas-impermeable region 104 is pressed toward the electrolyte membrane 22 by the first gas-impermeable region 100 and the second gas impermeable region 102. Thus, the connection reliability between the third gas-impermeable region 104 and the conductor 106 can be improved and eventually the operation reliability of the fuel cell 10 can be improved.

(Method for Fabricating a Composite Membrane)

A method for fabricating a composite membrane 12 used for the fuel cell 10 according to the second embodiment will now he described with reference to FIG. 11A to FIG. 11F.

Figures 11A, 11B:
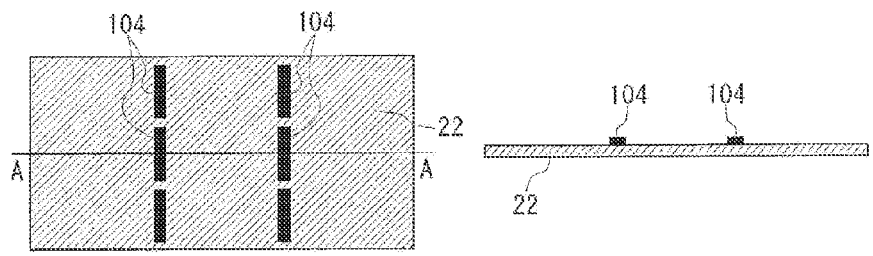
FIGS. 11A to 11F are process diagrams showing a fabrication method of a composite membrane used for a fuel cell according to a. second embodiment.

Similar to FIG. 3, an electrolyte membrane 22 is first prepared. Then, as shown in FIGS. 11A and 11B, a third gas-impermeable region 104 is formed on the electrolyte membrane 22 in a region interposed between the MEA forming regions. In the second embodiment, the shape of the planar shape of the third gas-impermeable region 104 is rectangular but should not be considered as limiting.

Figures 11C, 11D:
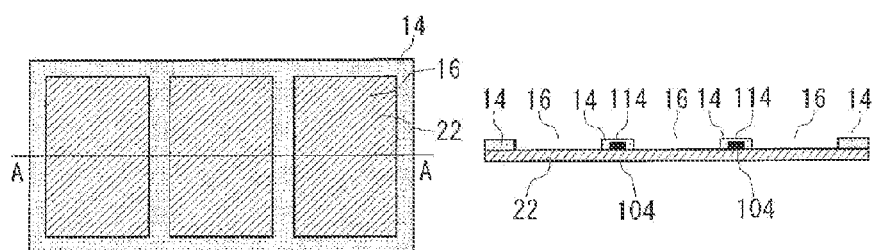

Then, as shown in FIG. 11C and 11D, a substrate 14 is placed on the electrolyte membrane 22, and the substrate 14 is subjected to thermocompression bonding in such a manner as to seal the third gas-impermeable region 104 while the substrate 14 is deformed. Openings 16 corresponding to the MEA forming regions are provided in the substrate 14. If the third gas-impermeable region. 104 is thick, a recess 114 into which the third gas-impermeable region 104 may be provided beforehand. in between adjacent openings 16.

Figures 11E, 11F:
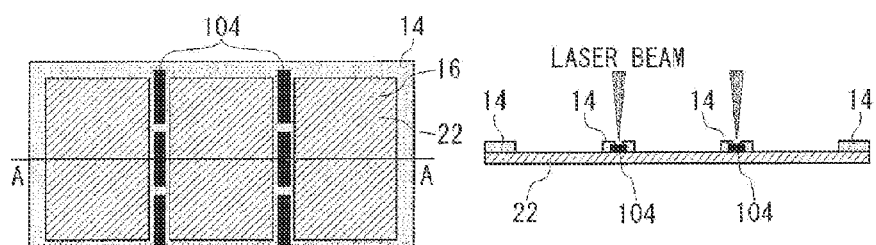

Then, as shown in FIG. 11E and 11F, laser is irradiated to the substrate 14 in contact with the third gas-impermeable region 104 from the anode side of the electrolyte membrane 22 Thereby, the substrate 14 is selectively removed and the third gas-impermeable region 104 is exposed.

Then, the processes similar to those described in conjunction with FIG. 4A to FIG. 5F are performed, so that the composite membrane 12, into which the MEAs 20 according to the second embodiment are incorporated, can be simply and easily manufactured.

(Third Embodiment)

Figure 12:
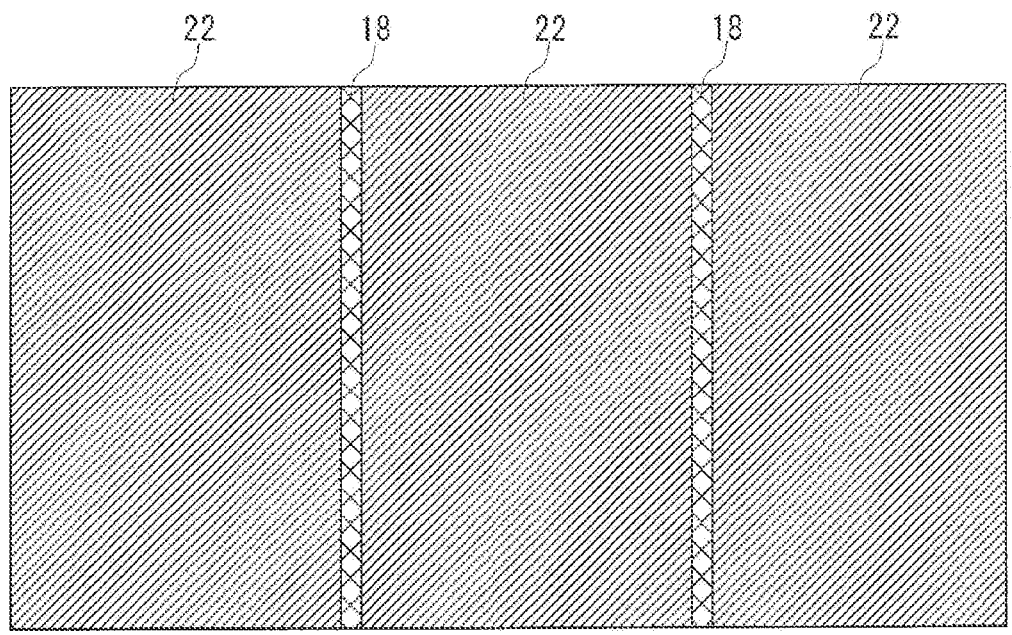
FIG. 12 is a planar view of an electrolyte membrane and an interconnector of a fuel cell, as viewed from a cathode side, according to a third embodiment of the present invention.

A fuel cell 10 according to a third embodiment is basically the same as the first embodiment excepting a mode of carrying out the invention with regard to an electrolyte membrane 22 and an interconnector 18. FIG. 12 is a planar view of the electrolyte membrane 22 and the interconnector 18 of the fuel cell 10, as viewed from the cathode side, according to the third embodiment of the present invention. In the fuel cell 10 according to the above-described first and second embodiments, the electrolyte membrane 22 constituting one MEA 20 and the electrolyte membrane 22 constituting another MEA in a plurality of adjacent MEAs 20 are connected to each other. In contrast thereto, in the fuel cell 10 according to the third embodiment, the interconnector 18 extends entirely over the adjacent MEAs 20. One electrolyte membrane 22 constituting one MEA 20 and the electrolyte membrane 22 constituting another MEA 20 are separated or divided by this interconnector 18.

By employing the third embodiment, an advantageous effect where the sectional area of the interconnector can be made larger is achieved in addition to the same advantageous effects achieved by the first embodiment. Thus, the resistance when the MEAs 20 are electrically connected can be reduced.

(Method for Fabricating a Composite Membrane)

A method for fabricating a composite membrane 12 used for the fuel cell 10 according to the third embodiment will now be described. with reference to FIGS. 13A-13C.

The basic method for manufacturing the composite membrane 12 according to the third embodiment is same as the method employed in the first embodiment. A description is given hereunder of a method for fabricating the semiconductor 10 according to the third embodiment centering around differences from the method according to the first embodiment.

Figure 13A:
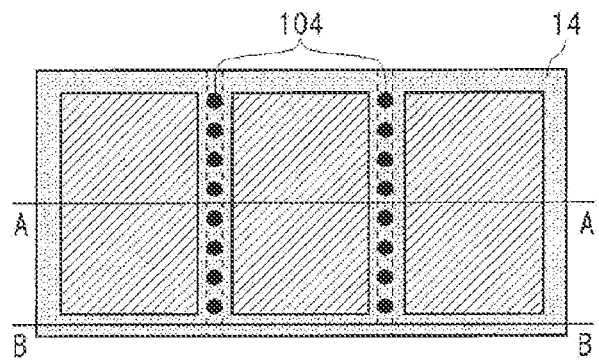
FIGS. 13A to 13C are process diagrams showing a fabrication method of a composite membrane used for a fuel cell according to a third embodiment.
Figure 13B:
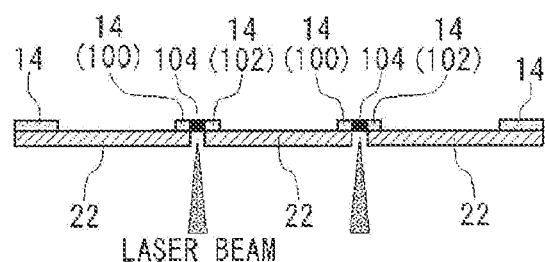
Figure 13C:
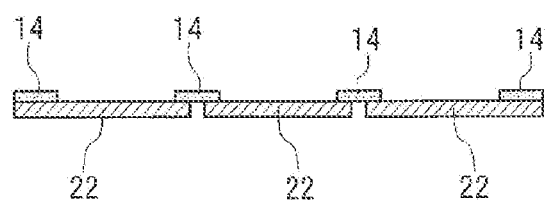

After the processes shown in FIGS. 13A and 13B, laser is irradiated to a predetermined region of the electrolyte membrane 22 from the cathode side. This predetermined region corresponds to a region, corresponding to a region across the electrolyte membrane, including a region were the third gas-impermeable region 104 is formed. This predetermined region. of the electrolyte membrane 22 is selectively removed by the laser irradiation. Thereby, the electrolyte 22 is divided into regions corresponding to the respective MEAs 20, and the third gas-impermeable region 104 is exposed at the cathode side. The wavelength of laser beam used in this process lies in a range within which the electrolyte membrane 22 can. be processed, namely 1064 to 10,600 nm, for instance.

Then, the processes similar to those described in conjunction with FIG. 4A to FIG. 5F are performed, so that the composite membrane 12, into which the MEAS 20 according to the third embodiment are incorporated, can be simply and easily manufactured.

(Fourth Embodiment)

FIG. 14 is a cross-sectional view showing a structure of a fuel cell 10 according to a fourth embodiment of the present invention. In the fuel cell 10 according to each of the above-described first, second and third embodiments, the openings 16 corresponding to the MEA forming regions are provided in the electrolyte membrane 22 having a shape and an area by which a plurality of MEAs can be provided side by side, and the substrate 14 is placed on the electrolyte membrane 22. In contrast to this, according to the fourth embodiment, the electrolyte membranes 22 are formed between the substrates 14 each having the openings 16 corresponding the MEAs. Also, in the fuel cell 10 according to each of the above-described first and second embodiments, the electrolyte membrane 22 constituting one MEA 20 in adjacent MEAs 20 connects to the electrolyte membrane 22 constituting another MEA in the adjacent MEAs 20. According to the fuel cell 10 of the fourth embodiment, on the other hand, the interconnector 18 extends entirely between the adjacent MEAs 20, similarly to the fuel cell 10 of the third embodiment. This interconnector 18 separates the electrolyte membrane 22 constituting one MEA 20 in adjacent MEAs 20 from the electrolyte membrane 22 constituting another MEA in the adjacent MEAs 20, and vice versa.

Then, as shown in FIG. 6B, a layered product 420 comprised of the conductive sheets 400 and the resin sheets 410 are cut in rectangles and then cleansed so as to obtain a compound material 430.

Note here that the conductive sheet 400 corresponds to the third gas-impermeable resin 104 as shown in FIG. 15C and 15D. Also, a resin sheet 410 stacked on one side of the conductive sheet 400 corresponds to the first gas-impermeable region 100. A resin sheet 410 stacked on the other side thereof corresponds to the second gas-impermeable region 102 as shown in FIG. 15C and 15D.

The first gas-impermeable region 100 and the second gas-impermeable region 102 are configured to prevent transmission of laser beam used in processing a catalyst layer. By employing this method and structure, laser beam is so controlled as not to permeate the first gas-impermeable region 100 and the second gas-impermeable region 102 when the laser beam is irradiated to process the anode catalyst layer 24 and the cathode catalyst layer 26. As a result, it prevents laser burn-through into the catalyst layer on the opposite side of the catalyst layer to be processed The fibers in the dielectric layer are so oriented as to prevent the transmission of laser beam. For example, where the cloth of glass fibers is used, the orientation of glass fibers is preferably not placed in a direction toward the laser beam so that the fibers do not serve as a light transmissive material. For example, the fibers are oriented at an angle of 45 degrees relative to the laser beam used for the processing of the catalyst layer, so that laser transmission volume can be significantly reduced. Furthermore, an dielectric layer may constitute epoxy resin added with additive that absorbs laser beams for use in catalyst processing.

The fourth embodiment not only achieves the same advantageous effects as those achieved by the first, second and third embodiments but also can reduce the projected area of a substrate section which does not contribute to the power generation. In other words, the projected area of a substrate section can be made smaller when a connection portion between the electrolyte membrane 22 and the substrate 22 serves as a side surface of the substrate 14.

Thus, the fourth embodiment can form a fuel cell where the integration degree, namely the output per projected area, is higher than that in the first, second and third embodiments.

(Method for Fabricating a Composite Membrane)

A method for fabricating a composite membrane 12 used for the fuel cell 10 according to the fourt embodiment will now be described with reference to FIGS. 15A to FIG. 15F. In FIGS. 15A to FIG. 15F, diagrams on the left show plan views whereas those on the right show cross-sectional views taken along the line A-A of the respective plan views.

As shown in FIGS. 15A and 15B, a glass sheet 500 that serves as a base by which to form a plurality of MEAs is first prepared. Note that this glass sheet 500 is to be removed in The middle of a process.

Then, as shown in FIGS. 15C and 15D, a substrate 14 is placed on the substrate 14, and ends of the glass sheet is fixed with adhesive (not shown). Openings 16 corresponding to the forming regions of MEAs (MEA forming regions) are provided in the substrate 14. Through-holes 112 are provided in a region between adjacent openings 16 at predetermined intervals. A third gas-impermeable region 104 is filled into the through-hole 112. The third gas-impermeable region 104 may be filled beforehand into the through-hole 112 before the substrate 14 is placed on the electrolyte membrane 22. Or the third gas-impermeable region 104 may be filled into the through-hole 112 after the substrate 14 has been placed on the electrolyte membrane 22.

Then, as shown in FIGS. 15E and 15F, an electrolyte dispersion liquid, in which electrolyte is dispersed in a solution, is applied through the openings 16. The solution is evaporated and solidified, and is subjected to heat treatment. It is desirable that the electrolyte dispersion liquid be so formed as to have a uniform thickness and it is vital that air bubble is prevented from being mixed therein when the electrolyte dispersion liquid is applied. It is desirable that the solution whose concentration is as low as possible be used to prevent the air bubble from being mixed therein and to remove the air bubble. Also, the interface between the substrate and the electrolyte can be formed entirely in a substrate height direction in a closed-attached manner when the electrolyte is filled into an opening of the substrate up to the top surface of the substrate and then dried out. Thus, if a weaker solution and a deeper opening in the substrate are used, the bonding area between the electrolyte and the substrate increases and therefore the bonding strength can increase. Suppose, on the other hand, that a membrane having the same thickness is to be formed using a solution whose concentration is low and a solution whose concentration is high, respectively. If the membrane is formed. using the solution whose concentration. is low, more solution must be present and held in the opening and also the opening in the substrate must be deeper. In contrast, is the membrane is formed using the solution whose concentration is high, less solution must be present and held in the opening and also the opening in the substrate may be shallow. Use of solution whose concentration is high is desirable to form a thinner fuel cell layer. For example, the opening 16 in the substrate 14 is formed such that the depth of the opening 16 in the substrate 14 is 75 to 150 µm, by the use of 20 wt. % Nafion. dispersion liquid (DuPont D2020) and such that the Nafion dispersion liquid is filled up to the top surface of the substrate 14 and is dried out. Thereby, the electrolyte membrane with an appropriate thickness of 15 to 30 µm can be formed in the fuel cell while a sufficient bonding strength between the electrolyte and the substrate is assured. If the 20 wt % Nafion dispersion solution, whose thickness is 75 to 150 µm, is left as it stands at room temperature and is dried, the surface hardening may develop first and the electrolyte membrane may suffer a crack. In order to form a crack-free electrolyte membrane with no cracks occurrng on the surface thereof, the electrolyte needs to be evaporated gradually and the evaporation rate of the electrolyte can be suppressed by lowering the temperature and/or pressurizing the electrolyte. For example, when the 20 wt. % Nafion dispersion liquid is filled at the thickness of: 75 to 150 µm, it is dried, for about eight hours by keeping a dry atmosphere before it is subjected to heat treatment for twenty minutes at a temperature of: 120° C, thereby forming an excellent membrane.

Figure 16A:
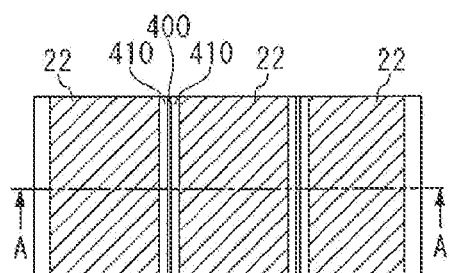
FIGS. 16A to 16F are process diagrams showing a fabrication method of a composite membrane used for a fuel cell according to a fourth embodiment.
Figure 16B:
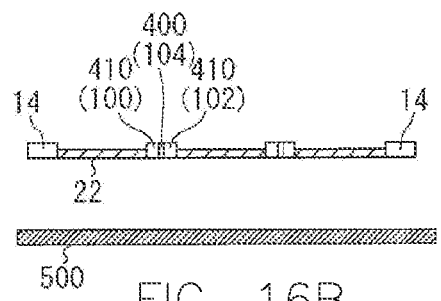

Then, as shown in FIGS. 16A and 16B, the composite membrane 12 where the electrolyte membrane 22 is formed in the openings 16 in the substrate 14 is removed from the glass sheet. In the fourth embodiment, the surface of the electrolyte membrane 22, which is closely attached to the glass surface and which is formed on the same surface as the substrate 14, is a cathode side, whereas the surface of the electrolyte membrane opposite to the above-described surface thereof is an anode side. As shown in FIG. 16D, regions holding the third gas-impermeable region 104 therebetween are the first gas-impermeable region 100 and the second gas-impermeable region 102.

Figure 16C:
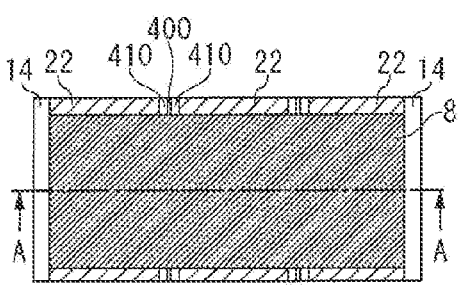
Figure 16D:
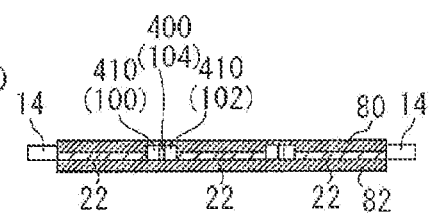

Then, as shown in FIGS. 16C and 16D, the peripheral parts of the electrolyte membrane 22 are left intact, and a catalyst slurry is applied to the entire electrolyte membrane 2 on the anode and cathode sides, thereby forming a catalyst layer 80 and a catalyst layer 82.

Figure 16E:
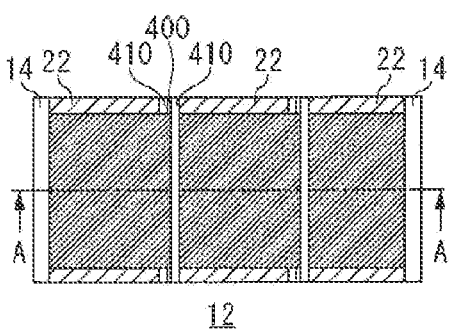
Figure 16F:
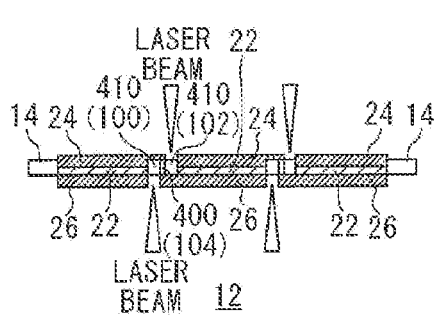

Then, as shown in FIGS. 16E and 16F, the catalyst layer applied to the anode side of the electrolyte membrane 22 is selectively removed by the laser irradiation so as to form an anode catalyst layer 24, and the second gas-impermeable region 102 is exposed. On the other hand, the catalyst layer applied to the cathode side of the electrolyte membrane 22 is selectively removed. by the laser irradiation so as to form a cathode catalyst layer 26, and a portion of the electrolyte membrane 22 in contact with the first gas-impermeable region 100 is exposed. In other words, a region of the catalyst layer 82, corresponding to the first gas-impermeable region 100, with the electrolyte membrane 22 being held between the catalyst layer 82 and the first gas-impermeable region 100 in the catalyst layer 80 is irradiated with laser so as to selectively remove the catalyst layer 82. Since the laser beam that has transmitted the electrolyte membrane 22 is blocked by the first gas-impermeable region 100, the occurrence of damage to the catalyst layer 80 can be suppressed. The wavelength of laser used in this process lies in a range where the catalyst layer (electrode) 82 can be processed and the electrolyte membrane 22 can be transmitted, namely 180 to 550 nm, for instance.

The composite membrane 12, into which the MEAs 20 according to the fourth embodiment are incorporated, is simply and easily manufactured through the above-described processes.

As a modification of the fourth embodiment, a compound material (current collector) 420 shaped in rectangles similarly to the modification of the first embodiment is used. Thus, the composite membrane 12, into which the MEAs 20 according to the modification of the fourth embodiment are incorporated, is simply and easily manufactured.

In the first gas-impermeable region 100 and the second gas-impermeable region 102 of the substrate 14 and the compound material (current collector) 420 shaped in rectangles, a resin sheet 410 equivalent to the first and second gas-impermeable regions 100 and 102 needs to be joined to the electrolyte membrane 22 with sufficient strength.

An intermediate layer having high adhesiveness may be provided between the first and second gas-impermeable regions 100 and 102 and the resin sheet 410 and the electrolyte membrane 22.

Also, the quality of material for the first and second gas-impermeable regions 100 and 102 and the resin sheet 410 may be such that they have high adhesiveness to the electrolyte membrane 22. For example, when 20 wt. % Nafion dispersion liquid is used as the electrolyte membrane 22, the first and second gas-impermeable regions 100 and 102 and the resin sheet 410 are formed of epoxy resin. For example, Araldite LY1556, Aradur 917, Araldite GY508, and Accelerator 070 of Huntsman are compounded in a weight ratio of 29:29:41:1 so as to obtain excellent adhesion property.

Also, the first and second gas-impermeable regions 100 and 102 and the resin sheet 410 may be subjected to the sandblasting or like process before they are bonded to the electrolyte membrane 22. In such a case, fine asperities of about 1 μm are formed on the surface and therefore the bonding strength between the first and second gas-impermeable regions 100 and 102 and the resin sheet 410 and the electrolyte membrane 22 can be enhanced by the anchor effect resulting from fine unevenness (fine asperities).

The present invention is not limited to the above-described embodiments only, and it is understood by those skilled in the art that various modifications such as changes in design may be made based on their knowledge and the embodiments added with such modifications are also within the scope of the present invention.

The above description is intended to be illustrative, and not restrictive. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37 C.F.R. §1.72 (b), to allow the reader to quickly ascertain the nature of the technical disclosure. It is submitted with the understanding that it will not be used to interpret or limit the scope or meaning of the claims.

What is claimed is:

1. A fuel cell layer, comprising:
 a composite layer having a first surface and a second surface, the composite layer comprising
  a plurality of interconnectors; and
  a plurality of ion conducting components, positioned between the interconnectors;
 a first plurality of electrode coatings disposed on the first surface to form anodes; and
 a second plurality of electrode coatings disposed on the second surface to form cathodes, each of the first and second plurality of electrode coatings in ionic contact with one of the ion conducting components and in electrical contact with one of the interconnectors,
  at least one of the interconnectors comprising a first gas-impermeable interface region and a second gas-impermeable interface region each comprising a dielectric material independently comprising glass fibers, an additive, or a combination thereof, wherein the additive is at least one of laser-scattering and laser-absorbing, wherein at least one of the glass fibers and the additive are configured to at least partially block the transmission of a laser beam through the dielectric material, wherein the first gas-impermeable interface region and the second gas-impermeable interface region each has a first surface and a second surface, the first surface in contact with one of the ion conducting components; and
 a third gas-impermeable region that is electrically conductive having two surfaces and a length parallel to the two surfaces, one of the surfaces disposed adjacent to the second surface of the first and second gas-impermeable interface regions;
 wherein the interconnector and the third gas-impermeable region electrically connect the anode of one fuel cell to the cathode of an adjacent fuel cell.

2. A fuel cell layer according to claim 1, wherein at least one electrode coating selected from the first plurality of electrode coatings extends from the composite layer, coats the first gas-impermeable region, and is connected to the third gas-impermeable region.

3. A fuel cell layer according to claim 1, wherein at least one electrode coating selected from the second plurality of electrode coatings extends from the composite layer and is connected to the third gas-impermeable region.

4. A fuel cell layer according to claim 1, wherein at least two electrode coatings selected from the first plurality of electrode coatings are formed integrally with each other, and wherein the interconnector electrically connects at least one electrode coating selected from the first plurality of electrode coatings and at least one electrode coating selected from the second plurality of electrode coatings via a through-hole provided in the first and second plurality of electrode coatings.

5. A fuel cell according to claim 1,
 wherein an interconnector selected from the plurality of interconnectors comprises said third gas-impermeable region and extends in between one membrane electrode assembly comprising at least one electrode coating selected from the first plurality of electrode coatings in contact with at least one ion conducting component selected from the plurality of ion conducting components and another membrane electrode assembly comprising at least one electrode coating selected from the first plurality of electrode coatings in contact with another at least one ion conducting component selected from the plurality of ion conducting components, and wherein the ion-conducting component of said one membrane electrode assembly and the ion-conducting component of said another membrane electrode assembly are divided by the interconnector.

6. A fuel cell layer according to claim 1, wherein at least one of the interconnectors provides an electrically conductive pathway between one of the first or second plurality of electrode coatings and an external circuit, said pathway extending along the length of the third gas-impermeable region.

7. A fuel cell layer according to claim 1, wherein the first and second gas-impermeable regions comprise the additive, and at least one additive comprises a pigment.

8. A fuel cell layer according to claim 7, wherein the pigment alters a material property of the first and second gas-impermeable regions to reduce transmittance of laser beam or increase absorption of laser beam, or a combination thereof.

9. A fuel cell layer according to claim 1, wherein the first and second gas-impermeable regions comprise the additive, and at least one additive comprises a metal oxide particle.

10. A fuel cell layer according to claim 9, wherein the metal oxide particle alters a material property of the first and second gas-impermeable regions to reduce transmittance of laser beam or increase absorption of laser beam, or a combination thereof 11. A fuel cell layer according to claim 1, wherein the first and second gas-impermeable regions comprise a cloth woven of the glass fibers and impregnated with an epoxy resin, wherein the glass fibers are arranged at an angle of less than 90 degrees relative to the first surface of the composite layer.

12. A method of making a fuel cell layer comprising:
forming a composite layer having a first surface and a second surface, the composite layer comprising
a plurality of interconnectors; and
a plurality of ion conducting components, positioned between the interconnectors;
disposing a first plurality of electrode coatings on the first surface to form anodes; and
disposing a second plurality of electrode coatings on the second surface to form cathodes, each of the first and second plurality of electrode coatings in ionic contact with one of the ion conducting components and in electrical contact with one of the interconnectors,
wherein at least one of the interconnectors comprises
a first gas-impermeable interface region and a second gas-impermeable interface region each comprising a dielectric material independently comprising glass fibers, an additive, or a combination thereof, wherein the additive is at least one of laser-scattering and laser-absorbing, wherein at least one of the glass fibers and the additive are configured to at least partially block the transmission of a laser beam through the dielectric material, wherein the first gas-impermeable interface region and the second gas-impermeable interface region each has a first surface and a second surface, the first surface in contact with one of the ion conducting components; and
a third gas-impermeable region that is electrically conductive having two surfaces and a length parallel to the two surfaces, one of the surfaces disposed adjacent to the second surface of the first and second gas-impermeable interface regions;
wherein the interconnector and the third gas-impermeable region electrically connect the anode of one fuel cell to the cathode of an adjacent fuel cell, and wherein a transmission factor of the first and the second gas-impermeable regions is smaller than that in the first and second plurality of electrode coatings with respect to transmission of laser beam used in processing a catalyst layer; and
selectively removing portions of the electrode coatings in line with the first and second gas-impermeable regions using a laser beam sufficient to provide electrical isolation between adjacent fuel cells.

\* \* \* \* \*